(12) United States Patent
Cox et al.

(10) Patent No.: US 8,624,840 B2
(45) Date of Patent: Jan. 7, 2014

(54) SMART MOUSE SYSTEM AND METHOD OF USE

(76) Inventors: Dail Robert Cox, Boise, ID (US); Justin Del Cox, Boise, ID (US)

(*) Notice: Subject to any disclaimer, the term of this patent is extended or adjusted under 35 U.S.C. 154(b) by 445 days.

(21) Appl. No.: 12/822,360

(22) Filed: Jun. 24, 2010

(65) Prior Publication Data

US 2010/0333170 A1 Dec. 30, 2010

Related U.S. Application Data

(60) Provisional application No. 61/219,765, filed on Jun. 24, 2009.

(51) Int. Cl.
*G06F 3/033* (2013.01)

(52) U.S. Cl.
USPC .................... 345/163; 345/157; 345/156

(58) Field of Classification Search
None
See application file for complete search history.

(56) References Cited

U.S. PATENT DOCUMENTS

| | | | |
|---|---|---|---|
| 6,980,175 B1* | 12/2005 | Narayanaswami | 345/2.3 |
| 2004/0113890 A1* | 6/2004 | Ranta | 345/166 |
| 2006/0146023 A1* | 7/2006 | Kidron et al. | 345/163 |
| 2008/0238873 A1 | 10/2008 | Dolatshahi | |

* cited by examiner

*Primary Examiner* — Muhammad N Edun

(57) ABSTRACT

The Smart Mouse technology is a computer mouse with its own computer, memory, Software, OS, networking and GUI. The Mousetop Window GUI is the viewport into the mouse and gateway between the mouse and computer(s). The mouse becomes a computer network where data can be stored and retrieved in the mouse buffer memory, mouse memory or between connected computer(s). Software and licenses can be served from the mouse allowing the sharing of software and licenses across multiple computers in proximity or remotely located. Shared cursor switching, drag and drop data and other interactive functions are available. Profile storage in the mouse allows for multiple configurations of networking or isolating the window. Concepts like keyboard switching, biometric access, child security and numerous other novel concepts are included with this technology. Added physical features like removable memory and connectivity to other hand held technology like iphone or ipad provide expanded communication functionality.

13 Claims, 10 Drawing Sheets

SMART MOUSE SYSTEM AND METHOD OF USE

CROSS REFERENCE TO RELATED APPLICATIONS

None.

FEDERALLY SPONSORED RESEARCH OR DEVELOPMENT

Not applicable.

JOINT RESEARCH AGREEMENT

Not applicable

SEQUENCE LISTING

Not applicable

TERMINOLOGY, DEFINITIONS AND CLARIFICATIONS

The terminology "computer(s)" refer to a computing device including desktop computers, workstation computers, laptop computers, notebook computers, handheld computing devices like Iphone or Ipad etc.

The computer mouse is simply a mouse that provides a physical user interface between the human and computers. It has been used worldwide for many years The smart mouse computer is the computer contained inside the computer mouse. The term smart mouse is used interchangeably with the term smart mouse computer.

The smart key example is used extensively in the patents an example to illustrate one of multiple ways to interface between the smart mouse and any computer(s). The smart key is just a single method of connectivity. Wire and/or wireless communications of any nature can be utilized and the smart key is not a requirement for connectivity.

Licensing software and software licensing serving are NOT the same thing.

Licensing software or licensing technology refers to accepting compensation for the intellectual property.

Software licensing or software license serving is the action of verifying a valid software license is present. In this case the license is served from the smart mouse using the license residing within the smart mouse.

Licensing the license serving intellectual property will be among the claims. Since no terminology for this concept exists and due to the novelty and uniqueness of this concept we had to define the concept of "licensing the license serving intellectual property" for clarity.

The term "connected computer" means the computer is connected to the smart mouse computer or multiple computers that connect only by way of the smart mouse computer. This is not to be confused with computers connecting to each other by a router or other type of network or wiring.

FIELD OF THE INVENTION

The present invention relates to the field of computers and computer pointing devices, and in particular to the use of the personal computer mouse as a computer in its own right.

BACKGROUND OF THE INVENTION

Many situations require the transfer of data between one or more computers. One situation is the transfer of data between an office computer and a home computer (two computers that are not in proximity to each other). Another situation is the transfer of data between two computers that are proximate to each other but have no common connection. Currently there are several methods in use to transfer data between two or more computers. Each of these methods, some of which are described below, has disadvantages.

One method involves communication between the computers in a common network environment. Many times however, the transfer of data between computers is inhibited when the computers do not share a common network. For example, a network in a work environment may be restricted for security reasons, from communication with any devices outside the network.

Another way to transfer data between two computers involves the copying of data to a portable medium in a first computer, transferring the medium to a second computer and then copying the data from the medium to the second computer. This also requires creating or duplicating files to package the data in the proper file format within the medium.

Still another way to transfer data between two computers requires attaching the data in a first computer to an email, receiving the email in a second computer and extracting the data from the email attachment. This method also requires that both computers have email access. This can be a problem when the two computers do not have reliable access to email.

SUMMARY OF THE INVENTION

In one embodiment, A system for transferring data from a first computer to a second computer, comprises a smart mouse with a memory, a processor/controller, an operating system, a first communication channel to the first computer, a second communication channel to the second computer, a first smart key installed in the first computer, the first smart key configured to provide communication between the first computer and the smart mouse over the first communication channel and a second smart key installed in the second computer, the second smart key configured to provide communication between the second computer the smart mouse over the second communication channel.

The data is transferred from the first computer to the second computer by transferring data from the first computer to the smart mouse via the first communication channel and data is transferred from the smart mouse to the second computer via the second communication channel or directly from the first computer to the second computer using the smart mouse networking.

The first and second communication channels can be part of the smart mouse, smart key or part of the first and second computers. For example the mouse would normally contain the hardware needed to communicate between the mouse and the computer in which the smart key is installed, while in other cases the smart key itself may contain the necessary communication hardware. The communication channel can take many forms including tethered with a wire or cable or wireless.

Depending upon the embodiment, the smart mouse and smart key can be portable and plug into the computer by a connection such as a universal serial bus (USB).

In another embodiment, the smart mouse or smart key hardware includes a biometric reader that allows only preapproved users to use the smart mouse or smart key and associated features.

Some of the methods of using the smart mouse and smart key system employ the concept of a Mousetop window. The Mousetop window is an application and data window on the computer display that displays the status of data copied with the system residing in the mouse memory and applications run in the Mousetop window. The Mousetop window also allows the user to switch the active cursor function between computers controlled with the smart mouse system. That is to say, the user selects within one of the Mousetop windows which of the computers has the active mouse cursor in the remaining desktop space. When the Mousetop window is displayed on all computers, it can display the same data, application and cursor simultaneously in multiple Mousetop windows on multiple computers. The smart mouse and smart key system have many methods for use. In one method the transfer of data from a first computer to a second computer via the smart mouse with memory, comprises establishing a first Mousetop window on the first computer, then establishing a second Mousetop window on the second computer. The user transfers data from the first computer to the smart mouse memory via the first Mousetop window. The user then activates the cursor for use on the second computer. Data is now transferred from the smart mouse memory to the second computer and is shown on the Mousetop window. In one method the user transfers data from the first computer to the second computer using the smart mouse network function. The Mousetop window is the gatekeeper to other computers and the gateway to the smart mouse.

In the method described above, the smart mouse contained the intermediate storage between the first and second computers. Another method transfers data from a first computer to a second computer via the smart key and smart mouse. This method establishes a first Mousetop window on the first computer with the smart key. The user transfers data from the first computer to the smart mouse via the Mousetop window. The data now resides on the smart mouse, which is physically moved to the second computer along with the smart key. In this embodiment the smart mouse acts as a data storage repository that is then connected to the second computer where a Mousetop window is spawned/launched and data is now available on the second computer. This embodiment would allow for running applications and software licenses out of the smart mouse itself from computer to computer or for just simple data transfer between computers without requiring a network or physical proximity of the computers.

In the embodiments described in this disclosure, the system can automatically spawn/launch the Mousetop window in a computer when the smart key is installed or when the smart mouse is activated. In this disclosure, the term spawn or launch means to initiate a program. The operating system, protocols, and memory could reside in either the smart key or the smart mouse or in both. The spawning/launching of the Mousetop window can be initiated from either the smart mouse or smart key hardware.

In other embodiments the method for transferring data from a first computer to a second computer via a smart mouse may be accomplished without the use of the Mousetop window. In these embodiments, the user copies data from a program application to a first copy buffer inside the smart mouse. The user can either switch between active computers or physically move the smart mouse to another computer. The user then copies the data from the smart mouse copy buffer to any applicable location on the second computer. The smart mouse copy to buffer function can be used in conjunction with the existing copy to computer buffer functions or can be set to override that functionality in favor of the smart mouse copy to buffer as a default.

The smart mouse system has many other uses beyond simply transferring data from one computer to another. Other uses include the storage of software application licenses on the mouse. Many software application packages are limited to one running copy of the application at a time. Sometimes this is referred to as a "one seat" license. Given the mobile work environment, many times a single user may need to run the application on different computers. One computer might be in the main office, another computer might be at home, another computer might be a mobile computer, and still another computer might belong to a client. In this case the cost of four software licenses would be expensive, especially when the application is only run on one machine at a time. When the smart mouse system holds the license key, the license can travel with the smart mouse and the user. The license may also be combined with a biometric reader on the smart mouse system, the running of an application or movement of data can be limited to authorized users by this means.

The smart keyboard is an independent embodiment of the smart mouse that can adopt similar connectivity between multiple computers and a single keyboard. The smart keyboard active computer functionality can be added as part of the Mousetop window computer switching or could be separately switched between computers without a smart mouse using specific keystrokes or functions to toggle between active computers sharing the same keyboard. In this disclosure, references to the smart mouse also refer to similar functions embodied in a smart keyboard.

The examples given to Smart Mouse and Smart Key have multiple implementations that one versed in the art will understand and should not limit the application of the concept to just the mouse. Many other hand held devices for example cell phone, blackberry, Ipod and others could be alternately configured to provide the communication channel that Smart Mouse provides. Indeed the Smart Key itself may not be necessary for the Smart Mouse concept to function. Alternate communication type like WiFi, Bluetooth even audio signaling could support Smart Mouse like functionality and although not all illustrated, should be covered in concept for the Smart Mouse application

BRIEF DESCRIPTION OF THE DRAWINGS

The summary above, and the following detailed description will be better understood in view of the enclosed figures which depict details of various embodiments. It should however be noted that the invention is not limited to the precise arrangement shown in the drawings and that the drawings are provided merely as examples.

DETAILED DESCRIPTION

Figure 1:
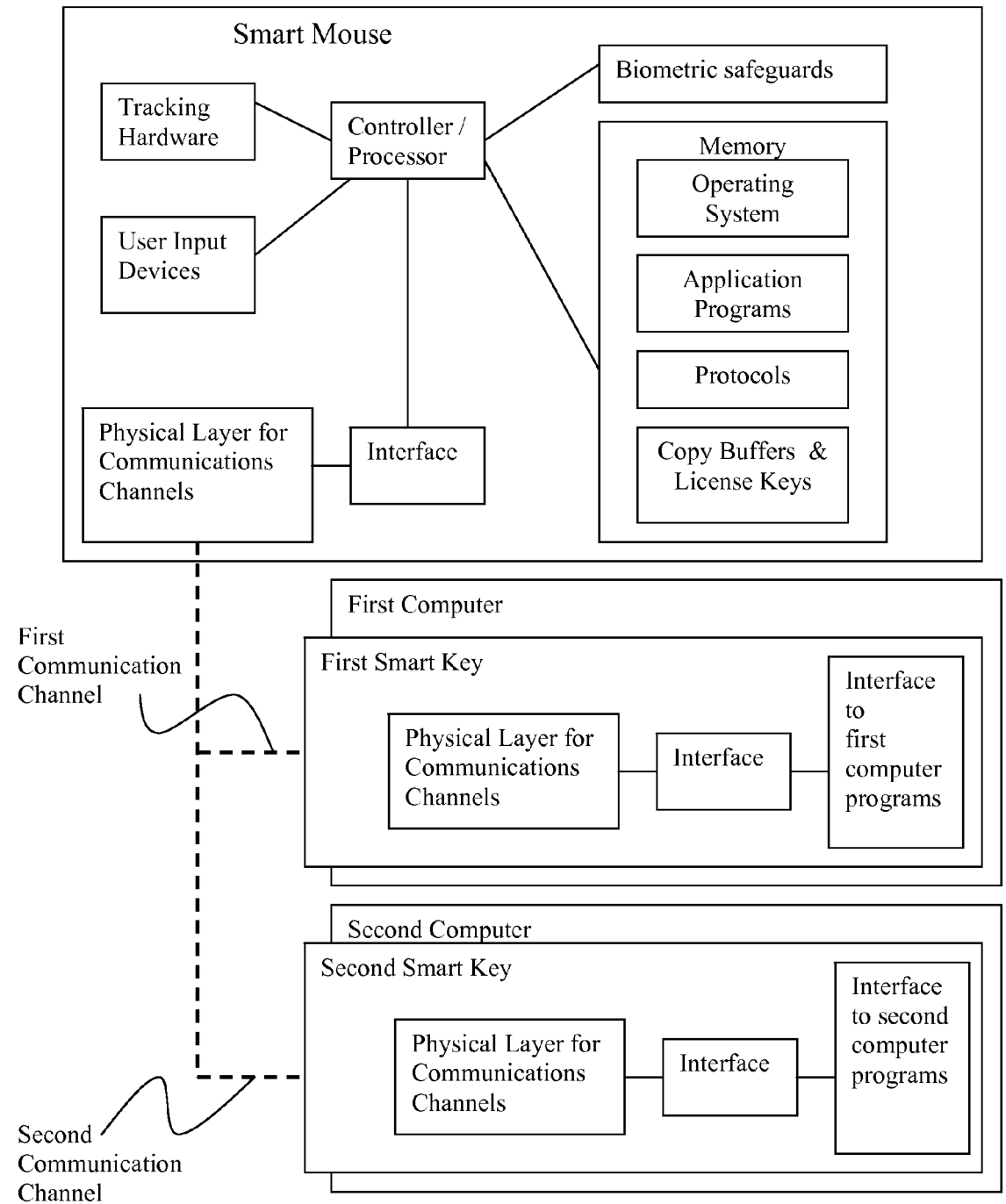
FIG. 1 shows one embodiment of the smart mouse system.

FIG. 1 shows one embodiment of the smart mouse system. A processor sometimes also known as a controller connects to a memory. The memory holds the operating system for the controller, application programs, various protocols, license keys and copy buffers. In some embodiments at least a portion of the memory is non-volatile. The smart mouse also contains tracking hardware to track the movement and/or location of the mouse and user input devices such as keys or buttons. The smart mouse includes an interface and physical layer enabling the smart mouse to communicate with one or more computers via communications channels. Two computers are shown in FIG. 1. A smart key located in each computer enables the computer to communicate with the smart mouse via the communication channels. While two computers and two smart keys are shown in FIG. 1, multiple computers each with a smart key are possible.

In some embodiments the smart key can be a plug in device such as a USB (Universal Serial Bus) or other device. In the embodiment shown in FIG. 1 the smart key contains the physical communication channels for communication with the smart mouse. In other embodiments the smart key can be purely software loaded onto the computer. In the software-only embodiment, the smart key relies on existing communication hardware installed on the computer. The smart key contains programs that enable communication with the smart mouse and with programs running on the computer.

In operation the smart mouse embodiment of FIG. 1 communicates with the first computer via the first communication channel. In addition to sending movement, position, tracking and user inputs, the smart mouse can also receive data from programs running on the first computer and store the data in the smart mouse memory. The smart mouse can then establish communication with the second computer via the second communication channel. The data stored in the smart mouse memory can then be sent to programs running on the second computer. This system enables the easy transfer of data such as text to be copied from one computer to another without the need of creating separate files, folders or email. The following figures illustrate example scenarios.

Figure 2:
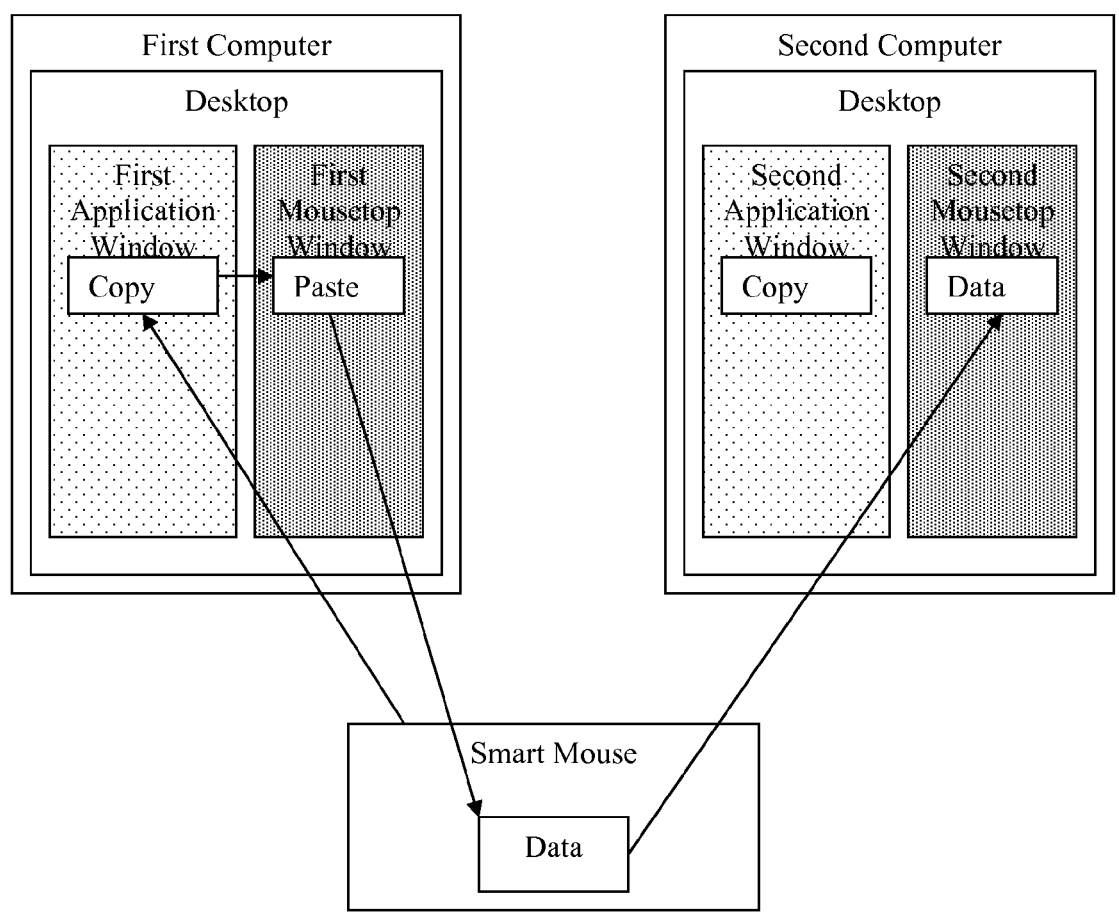
FIG. 2 shows one embodiment of a method for copying data from a first computer to the smart mouse system.
Figure 3:
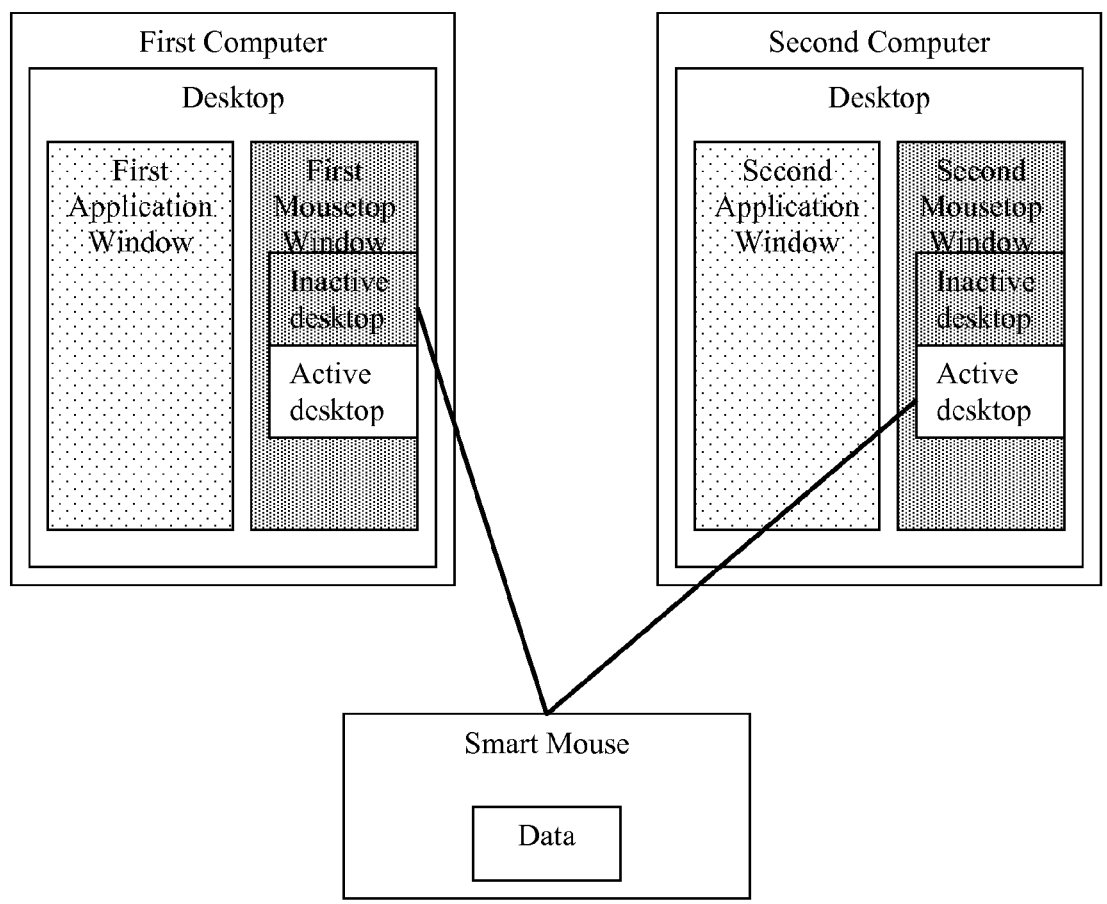
FIG. 3 shows one embodiment of changing the active desktop with the smart mouse system.
Figure 4:
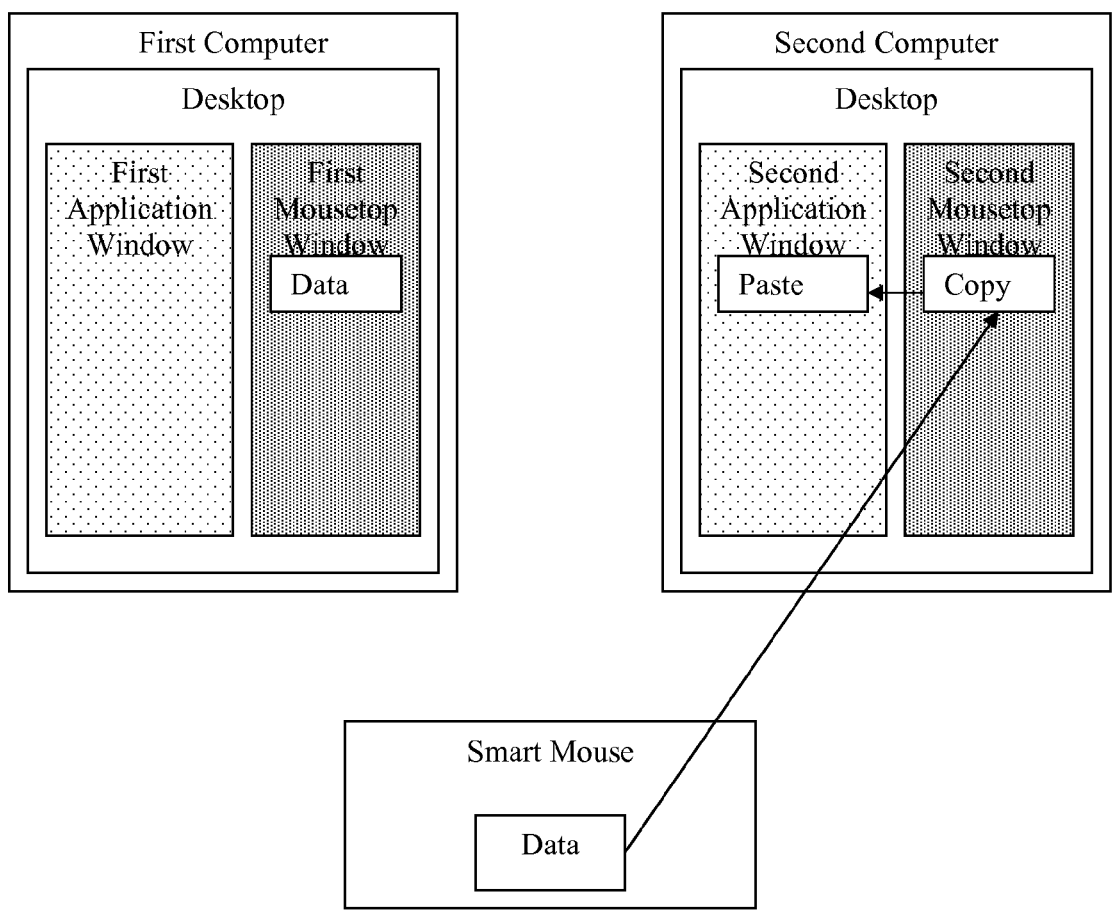
FIG. 4 shows one embodiment of a method for copying data from the smart mouse system to a second computer.

FIGS. 2-4 depict one embodiment of a method for transferring data between two computers. One skilled in the art will realize that while two computers are used in this example, the concept easily expands to more than two computers. In FIG. 2 two computers share a smart mouse. Although depicted side by side in FIGS. 2-4, long distances such as an office and a home could conceivably separate the two computers. When the smart mouse system is in operation, a Mousetop window is created on the first computer. The Mousetop window can be opened manually or automatically launched with the connection of the smart key. With a second smart key (FIG. 1) a second Mousetop window is created on the second computer. A user runs an application program on the first computer and wishes to transfer some of the data within the program to an application on the second computer. The user begins by performing a standard copy function within the first application window and then pasting the data into the first Mousetop window. The data is immediately stored into the smart mouse memory and seen in the Mousetop window. If the second computer is in communication with the smart mouse, the data appears simultaneously in the second computer's Mousetop window. In applications where the second computer is distant and not in communication with the smart mouse, the data can appear when communication is established with the second computer. When communication is established between the smart mouse and the second computer, a second Mousetop window can be launched in the second computer and data can be transferred from the smart mouse to the second computer via the second Mousetop window.

In FIG. 2-4. The user moves the cursor into the Mousetop window and the cursor appears in both Mousetop windows on both computers simultaneously. As the user moves the cursor out of the Mousetop window the cursor is only visible and active in one computer desktop environment at a time. This prevents the cursor from activating applications on the second computer's desktop environment. Selecting the active computer within the Mousetop window or through alternate methods like a physical switch on the mouse the user can select between computers to enable the desired computer's desktop for active functionality. The Mousetop acts as the gateway, a visualization of what is contained within the smart mouse and the smart mouse as the gate keeper between two or more computers.

In FIG. 4 if not done previously, when communication is established between the smart mouse and the second computer, a second Mousetop window can be launched in the second computer and data can be transferred from the smart mouse to the second computer via the second Mousetop window. The user can now copy the data in the second Mousetop window and paste it into the second computer. Note that this copy and paste operation from the first computer to the second computer was accomplished without the use of requiring the user to create and transfer or email files. The smart mouse system performed and hid the file transfer functions. The process flow can be utilized in any direction between multiple computers.

Figure 5:
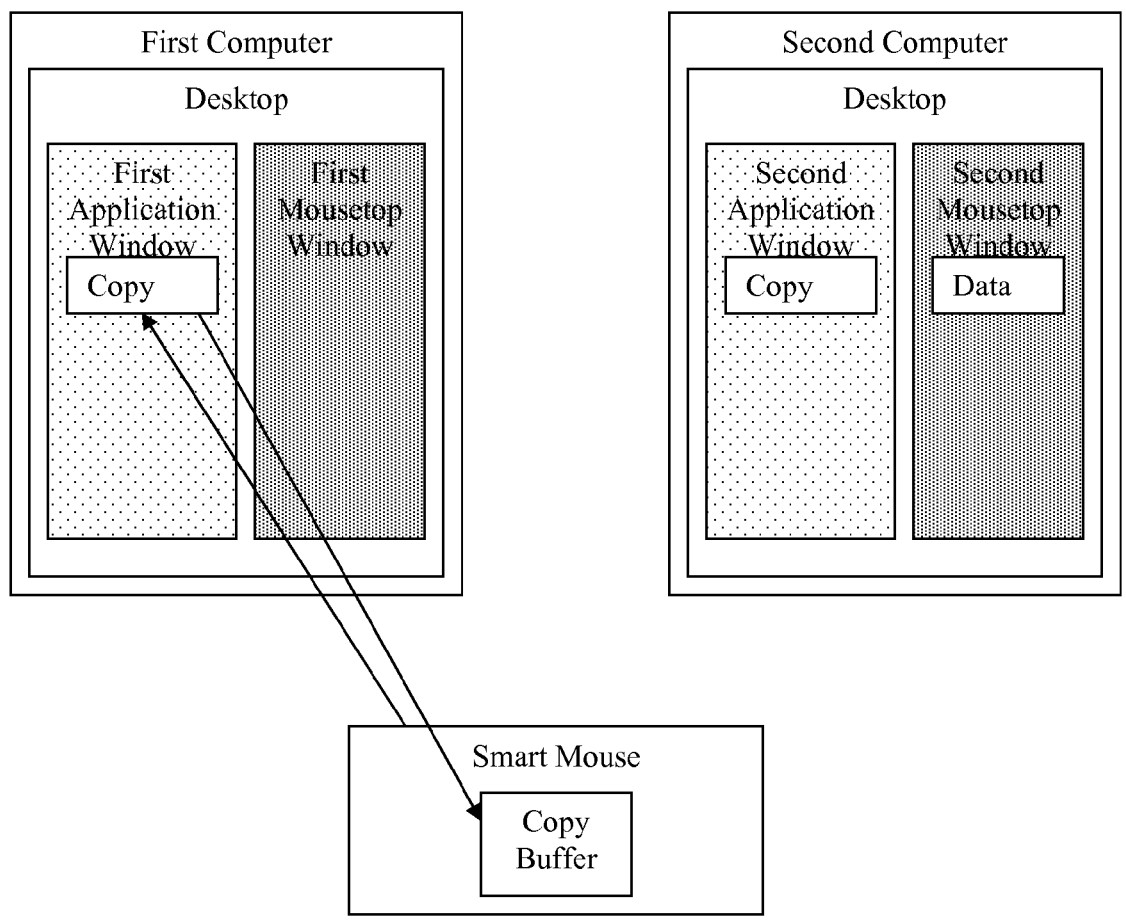
FIG. 5 shows one embodiment of a method for copying data from a first computer to the smart mouse system via a copy buffer.
Figure 6:
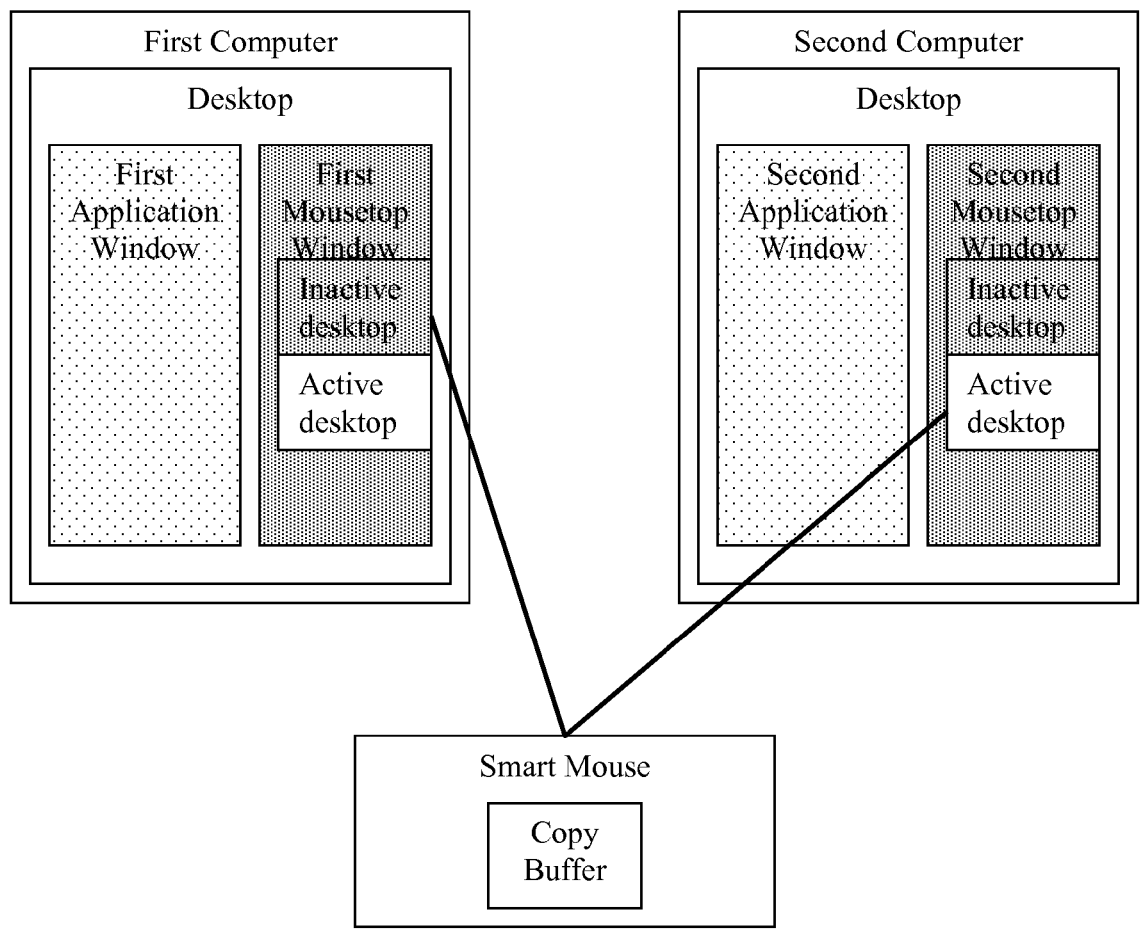
FIG. 6 shows one embodiment of changing the active desktop with the smart mouse system within the Mousetop window.
Figure 7:
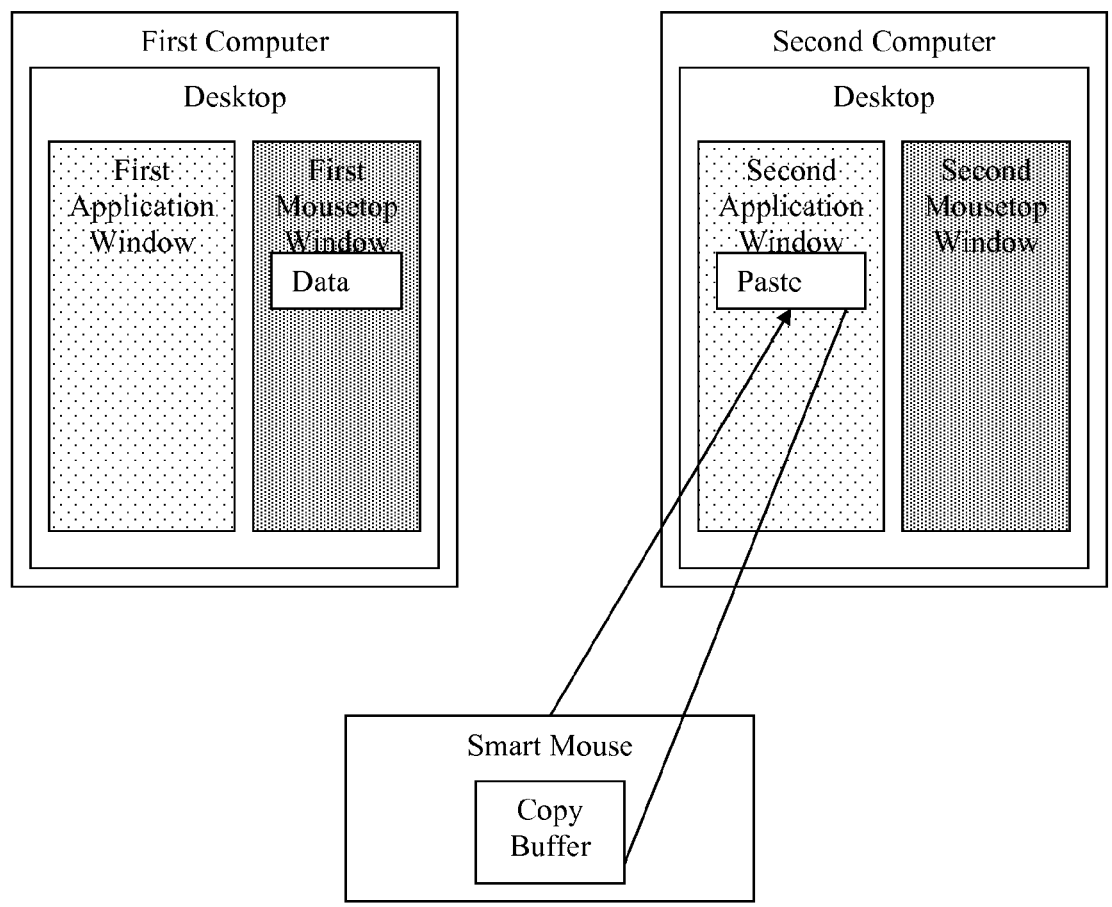
FIG. 7 shows one embodiment of a method for copying data from the smart mouse system to a copy buffer on a second computer.

FIGS. 5-7 depicting another embodiment of a method for transferring data between two computers utilizing the smart mouse copy to buffer. One skilled in the art will realize that while two computers are used in this example, the concept easily expands to more than two computers. In FIG. 5 two computers share a smart mouse. Although depicted side by side in FIGS. 5-7, long distances such as an office and a home could conceivably separate the two computers. When the smart mouse is in operation, a Mousetop window is created on the first computer. If the second computer is also proximate, a second Mousetop window is created on the second computer. A user runs an application program on the first computer and wishes to transfer some of the data within the program to an application on the second computer. The user begins by performing a standard select and copy to buffer function within the first application window. Unlike the depiction in FIG. 2 the user does not paste the data into the first Mousetop window. The program of the first Mousetop window transfers the selected data in the first computer to the copy buffer memory in the smart mouse. In some embodiments the data can also be visually shown in the Mousetop window. If the second computer is in communication with the smart mouse, the data can also be displayed and copied in the second Mousetop window. In applications where the second computer is distant and not in communication with the smart mouse, the data can appear when communication is established with the second computer.

In FIG. 6. the user switches the active computer within the Mousetop window or through alternate methods like a physical switch on the mouse. The user can select between computers to enable the desired computer's desktop for active functionality. This action enables the user to interact with application programs running on the second computer.

In FIG. 7 if not done previously, the data stored in the smart mouse copy buffer is accessible by the copy buffer of the second computer. The copy buffer data can also be displayed in the second Mousetop window. The user can now copy smart mouse copy buffer data and paste it into an application running on the second computer. Note that this copy and paste operation from the first computer to the second computer was accomplished without the use of requiring the user to copy data from and paste data into a separate file. The smart mouse system performed and hid the file transfer functions between the copy buffers of the two computers. The copy operations depicted in FIGS. 5-7 were described in terms of a single copy operation. The smart mouse system can be configured to have multiple copy buffers to enable the transfer of several pieces of data between computers.

Figure 8:
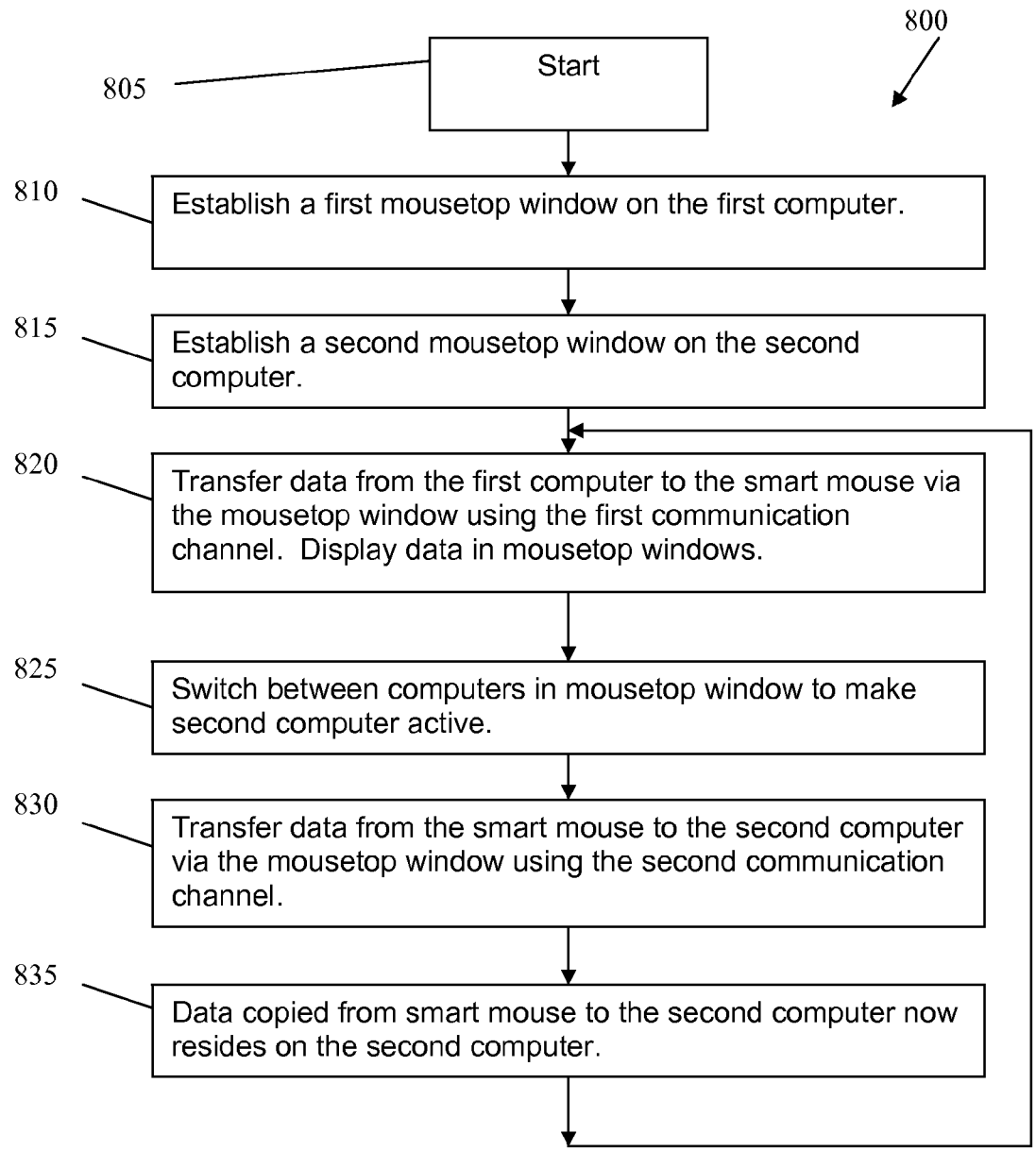
FIG. 8 shows a flow chart of one embodiment of copying data from a first computer to a second computer using the smart mouse, smart Key and the Mousetop window when computers are in proximity of each other.

FIG. 8 shows a flow chart of the data transfer method of FIGS. 2-4. The method 800 starts at 805. At 810 the smart mouse system establishes a mousetop window on the first computer. At 815 the smart mouse system establishes a mousetop window on the second computer. The action of 815 can also be accomplished later, for example when the two computers are not in close proximity and the mouse is transported between them. At 820 the user transfers data from an application on the first computer to the Mousetop window as the data is copied from the first computer to the smart mouse memory. The Mousetop window is a view port of the contents of the smart mouse so the data copied from the first computer will instantly appear in both Mousetop windows of the first computer and the second computer. If the second computer is not in communication with the smart mouse, the data will appear in the second mousetop window when communication is established between the smart mouse and the second computer. An example of this transfer is the copy and paste operation described in previous figures. At 825 the smart mouse changes the active computer in the Mousetop window making the second computer active. At 830, assuming the second Mousetop window is already established, the data in the smart mouse can be transferred to the second computer via an operation such as the copy and paste described earlier. At 835 the data is now resident on the second computer. FIG. 8 also shows an iterative loop from 835 to 820. This loop indicates that some embodiments may have multiple buffers and data items that can be copied from the first computer to the second computer with the smart mouse system. Those skilled in the art will realize that the order of the operations in FIG. 8 may be changed. For example, multiple data items may be transferred from the first computer in 820 prior to switching between computers in 825.

Figure 9:
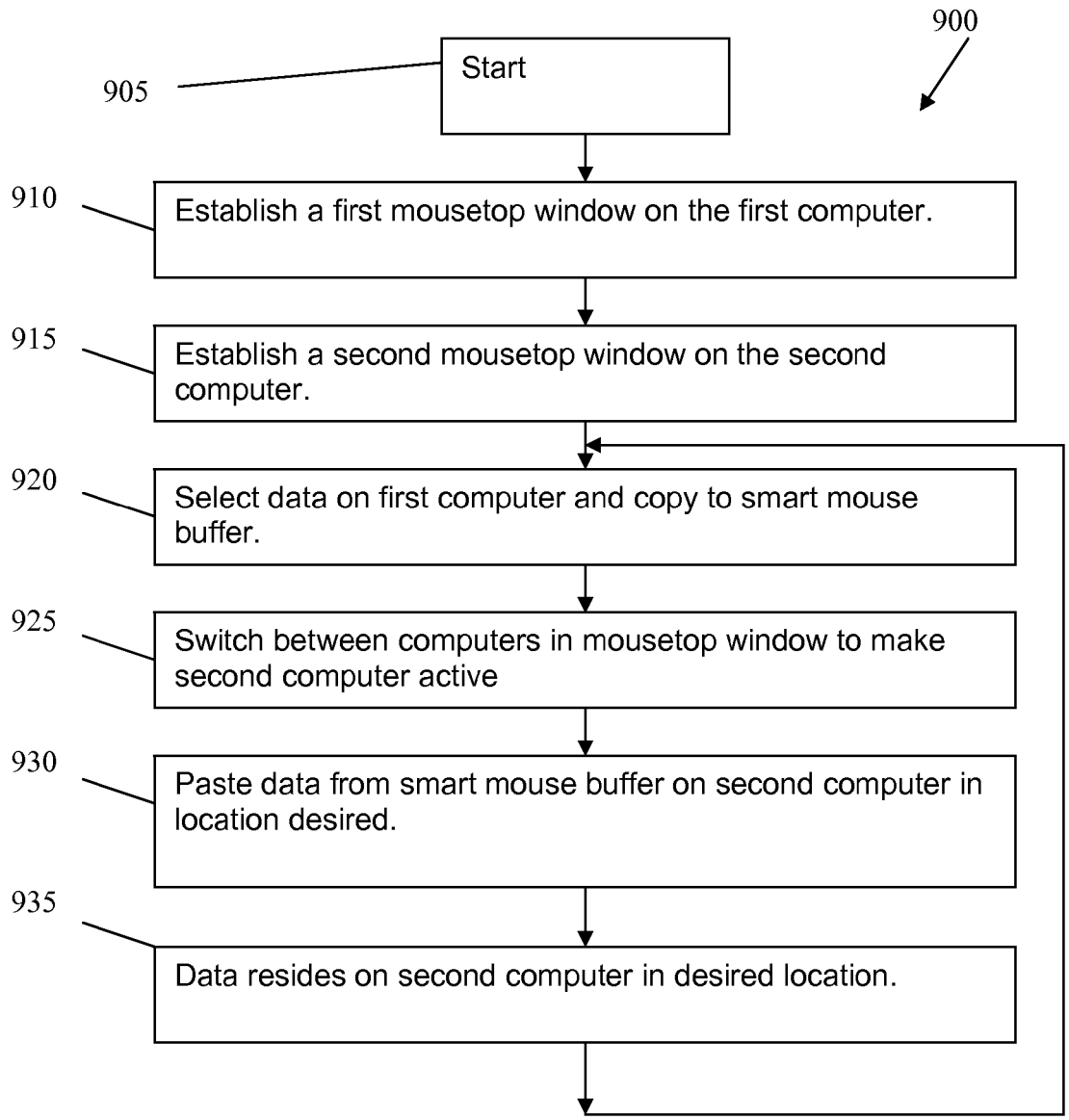
FIG. 9 shows flow chart of one embodiment of copying data from a first computer to a second computer using copy to smart mouse buffer.

FIG. 9 shows a flow chart of the data transfer method of FIGS. 5-7. The method 900 starts at 905. At 910 the smart mouse system establishes a Mousetop window on the first computer. At 915 the smart mouse system establishes a Mousetop window on the second computer. The action of 915 can also be accomplished later, for example when the two computers are not in dose proximity and the mouse is transported between them. At 920 the user transfers data from an application on the first computer to the smart mouse copy buffer as the data is selected and copied to the smart mouse copy buffer. An example of this transfer is the copy and paste to buffer operation described in previous figures. At 925 the smart mouse changes the active computer in the Mousetop window making the second computer active. At 930, assuming the second Mousetop window is already established, the data in the smart mouse buffer can be transferred to the second computer via an operation such as the copy and paste from buffer described earlier. At 935 the data is now resident on the second computer. FIG. 9 also shows an iterative loop from 935 to 920. This loop indicates that some embodiments may have multiple copy buffers and data items that can be copied from the first computer to the second computer with the smart mouse system. Those skilled in the art will realize that the order of the operations in FIG. 9 may be changed. For example, multiple data items may be transferred from the first computer in 920 prior to switching between computers in 925.

In some embodiments the launching of a Mousetop window is not required. The smart key copies the contents of the copy buffer in the first computer and then copies the contents into the copy buffer in the second computer once the smart key in installed in the second computer.

Figure 10:
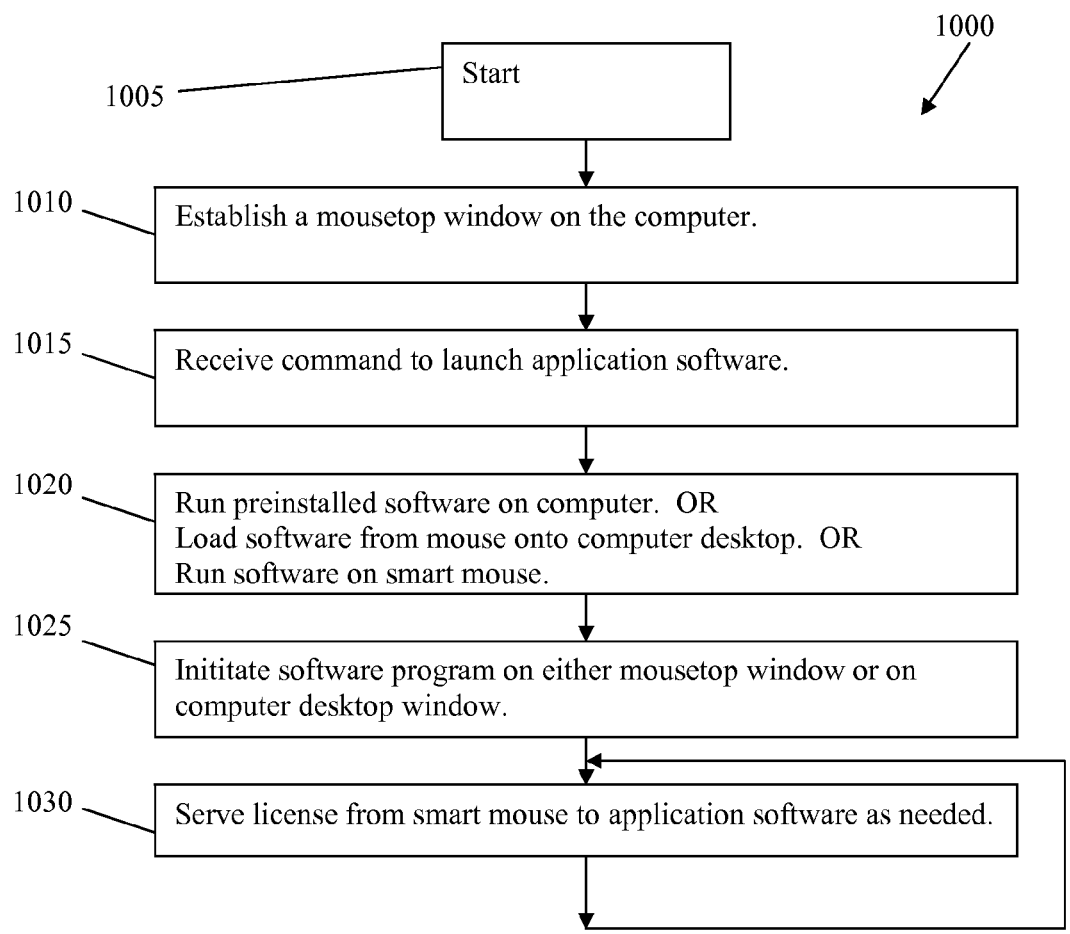
FIG. 10 shows flow chart of one embodiment of running applications and serving licenses from the smart mouse.

FIG. 10 shows a flow chart of running applications or serving licenses from the smart mouse for use in either the smart mouse application window or a desktop application. The process 1000 begins at 1005. At 1010 with the attachment of a smart mouse or smart key, a Mousetop window is established on the computer into which they are attached. At 1015 a command is received from either the computer desktop window or the Mousetop window to initiate (launch) a software application. Four possibilities, three of which are depicted in 1020 are: one the software already exists on the computer and run on the computer and displayed on the desktop; two the software is not already loaded on the computer but is loaded from the smart mouse memory onto the computer and run as in the first case; three, the software is not already on the computer but is run on the smart mouse processor and displayed in the Mousetop window; and four (not shown) the software is run as a background task on either the computer or smart mouse and is not displayed. At 1025, the software program is initiated regardless of the source of the software program and where it is run. At 1030, the smart mouse acts as the license server to the software program. The loop around block 1030 indicates that the smart mouse can continue to provide the license to the running application software as often as needed. In this manner the smart mouse and smart key can be used to run applications loaded onto the smart mouse on any computer even if the software has not been installed on the computer as the software is resident in the smart mouse.

Advantages

The smart mouse system offers several advantages some of which are listed below:

Data transfer between computers is sped up saving time with each transfer.

The accumulated savings in time can provide a large gain in productivity.

The need for common networks for sharing data or email access is reduced.

The smart mouse system can act as portable storage for application programs.

Service personnel can use the smart mouse as a carrier for diagnostics and other service related programs.

The ability of the smart mouse to act as a license server provides portability in computer licensing. The ability of the smart mouse to act as a computer network provides productivity gains and increases computer security Biometric protection of the smart mouse adds additional security to sensitive programs and passwords.

The license key feature of the smart mouse allows a "one seat" license to be portable yet still limited to one user at a time.

With non-volatile memory, no power is needed to store and transport data, files, programs, applications and licenses.

The security is build into the smart mouse system by its inherent nature, thereby protecting any and all computers accessed by smart mouse.

It will be appreciated that the invention is not limited to what has been described hereinabove merely by way of example. While there have been described what are at present considered to be the preferred embodiments of this invention, it will be obvious to those skilled in the art that various other embodiments, changes, and modifications may be made therein without departing from the spirit or scope of this invention and that it is, therefore, aimed to cover all such changes and modifications as fall within the true spirit and scope of the invention.

We claim:

1. A system for simultaneously merging, in a multi-computer environment, a computing environment of a first computer with a computing environment of a second computer, said first computer having a corresponding first graphical user interface, said second computer having a corresponding second graphical user interface, said first computer having a display means, comprising a system:
    wherein said second computer is portable and lacks a display means,
    wherein the system further includes a third computer having a display means
    wherein said second computer further includes a selecting means capable of selecting exactly one of (first computer, third computer),
    wherein data copying between said first computer and said third computer is enabled as follows:
        said first computer is selected, data on said first computer is selected using the display means of said first computer, said data is cut and stored in said second computer, said third computer is selected, said data stored on second computer is then pasted into said third computer using the display means of said third computer.

2. The system of claim 1, wherein said computing environment of said second computer further includes a computer application, and application data,
    wherein said second computer communicates with said first computer and displays the graphical user interface of said second computer on the display means of said first computer within the graphical user interface of the first computer.

3. The system of claim 2, wherein said second computer further includes licensed software and said first computer is configured to execute said licensed software of said second computer.

4. The system of claim 3, wherein second computer further includes licensing credentials associated with a software program wherein output of said software program is visible on said display means of said first computer and said software program is authorized by said licensing credentials on said second computer.

5. A system for simultaneously merging, in a multi-computer environment, a computing environment of a first computer with a computing environment of a second computer, said first computer having a corresponding first graphical user interface, said second computer having a corresponding second graphical user interface, said first computer having a display means, comprising a system:
    wherein said second computer is portable and lacks a display means,
    wherein said computing environment of said second computer further includes a computer application, and application data,
    wherein said second computer communicates with said first computer and displays the graphical user interface of said second computer on the display means of said first computer within the graphical user interface of the first computer,
    wherein the system further includes a third computer having a display means, wherein said second computer further includes a selecting means capable of selecting exactly one of (first computer, third computer),
    wherein data copying between said first computer and said third computer is enabled as follows:
        said first computer is selected, data on said first computer is selected using the display means of said first computer, said data is cut and stored in said second computer, said third computer is selected, said data stored on second computer is then pasted into said third computer using the display means of said third computer.

6. The system of claim 5, wherein said second computer further includes licensed software and said first computer is configured to execute said licensed software of said second computer.

7. The system of claim 6, wherein second computer further includes licensing credentials associated with a software program wherein output of said software program is visible on said display means of said first computer and said software program is authorized by said licensing credentials on said second computer.

8. The system of claim 5, wherein second computer further includes licensing credentials associated with a software program wherein output of said software program is visible on said display means of said first computer and said software program is authorized by said licensing credentials on said second computer.

9. A system for simultaneously merging, in a multi-computer environment, a computing environment of a first computer with a computing environment of a second computer, said first computer having a corresponding first graphical user interface, said second computer having a corresponding second graphical user interface, said first computer having a display means, comprising a system:
    wherein said second computer is portable and lacks a display means,
    wherein second computer further includes licensing credentials associated with a software program wherein output of said software program is visible on said display means of said first computer and said software program is authorized by said licensing credentials on said second computer,
    wherein said computing environment of said second computer further includes a computer application, and application data,
    wherein said second computer communicates with said first computer and displays the graphical user interface of said second computer on the display means of said first computer within the graphical user interface of the first computer,
    wherein the system further includes a third computer having a display means, wherein said second computer further includes a selecting means capable of selecting exactly one of (first computer, third computer),
    wherein data copying between said first computer and said third computer is enabled as follows:
        said first computer is selected, data on said first computer is selected using the display means of said first computer, said data is cut and stored in said second computer, said third computer is selected, said data stored on second computer is then pasted into said third computer using the display means of said third computer.

10. The system of claim 9, wherein said second computer further includes licensed software and said first computer is configured to execute said licensed software of said second computer.

11. A system for simultaneously merging, in a multi-computer environment, a computing environment of a first computer with a computing environment of a second computer, said first computer having a corresponding first graphical user interface, said second computer having a corresponding second graphical user interface, said first computer having a display means, comprising a system:
- wherein said second computer is portable and lacks a display means,
  - wherein said second computer further includes licensed software and said first computer is configured to execute said licensed software of said second computer,
  - wherein the system further includes a third computer having a display means,
  - wherein said second computer further includes a selecting means capable of selecting exactly one of (first computer, third computer), wherein data copying between said first computer and said third computer is enabled as follows:
    - said first computer is selected, data on said first computer is selected using the display means of said first computer, said data is cut and stored in said second computer, said third computer is selected, said data stored on second computer is then pasted into said third computer using the display means of said third computer.

12. The system of claim 11, wherein said computing environment of said second computer further includes a computer application, and application data,
- wherein said second computer communicates with said first computer and displays the graphical user interface of said second computer on the display means of said first computer within the graphical user interface of the first computer.

13. The system of claim 12, wherein second computer further includes licensing credentials associated with a software program wherein output of said software program is visible on said display means of said first computer and said software program is authorized by said licensing credentials on said second computer.

* * * * *